Francis K. Campbell
INVENTOR.

Francis K. Campbell
INVENTOR.
BY Vincent Martin
and Joe E. Edwards
ATTORNEYS

1

2,950,392

METHOD OF EXPLORATION FOR LOCATING HYDROCARBONS AND OIL

Francis K. Campbell, Houston, Tex., assignor, by mesne assignments, of one-half to The Moran Corporation, Houston, Tex., a corporation of Delaware Filed Oct. 12, 1956, Ser. No. 615,540

6 Claims. (Cl. 250—83)

This invention relates to a method of exploration for locating hydrocarbons and more especially to a method of locating oil through surveys providing a comparison of the intensity of various radiations with the intensity of radioactive gases emanating from their sources.

It is known that terrestrial and subterranean atomic radiations consist of alpha, beta and gamma radiations and of radioactive gases emanating from their sources of uranium, thorium, actinium and others which are more or less evenly distributed in the earth's crust.

It is known that such radiations can be measured singularly or in combination to determine the intensity of each individually or collectively and from such measurements conclusions may be drawn to establish known or unknown phenomena in a form that may be calculated. An example of a known phenomena is that an extremely high radiation anomaly is known to conform to a concentration of radioactive materials. An unknown phenomena may often be calculated from known effects of various materials upon known values of radiation as is the case with the subject invention described below.

Accordingly, it is an object of this invention to provide a method of locating hydrocarbons utilizing the principle that an unknown phenomena may be calculated from known effects of various materials upon known values of radiation.

Another object of this invention is to provide a method of locating hydrocarbons through surveys affording a comparison of the intensity of radioactive gases with the intensity of various other radiations emanating from the sources of the radioactive gases so that variations may be apparent and serve as an indication of the presence of hydrocarbons.

Another object of this invention is the provision of a method of locating hydrocarbons utilizing a graphic comparison of the results of surveys indicating the intensity of radioactive gases separately from various other radiations present.

Another object of this invention is to provide a method of locating hydrocarbons utilizing a graphic comparison of the result of surveys recording the intensity of radioactive gases in superposed relation to recordings of various other radiations present.

Still another object of this invention is to provide a method of locating hydrocarbons utilizing a graphic comparison of the results of surveys recording the intensity of radioactive gases, gamma radiation and all radiation recorded simultaneously and in superposed relation to each other so that a departure of the radioactive gases curve from the gamma and all radiations curve is indicative of the presence of hydrocarbons.

The invention will be more readily understood from a reading of the following specification and by reference to the accompanying drawings forming a part thereof, wherein an example of the invention is shown, and wherein.

Figure 1:
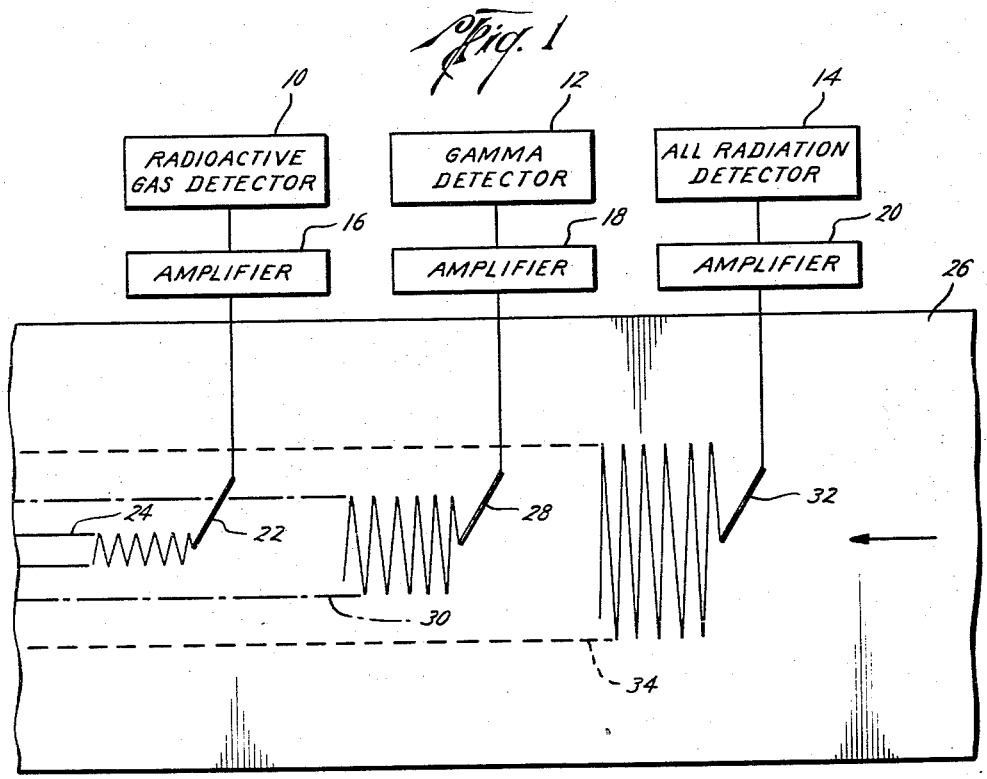
Figure 1 is a schematic view showing a preferred method of graphically recording radiation survey data according to a preferred embodiment of the invention.

One heretofore unknown phenomenon was the decline of radioactive gases over accumulations of hydrocarbons known to exist under producing oil fields surveyed. This led to the reasoning that since it is known that carbon atoms and radioactive particles have an affinity for each other and since it is known that hydrocarbon molecules manifest themselves above an oil field it is supposed that a portion of the radioactive particles of gaseous radiation are captured by the hydrocarbon molecules. Since most of the radioactive particles of radioactive gases and their transformation particles have a very short "half life," it is believed that when "captured" by the hydrocarbon molecules, that such radioactive particles are held until complete decay and change into other particles more or less non-radioactive. With this supposition providing sound reasoning for the decline of gaseous radioactivity over oil fields, the following experiments were made.

In the first experiments, using various scintillators and Geiger type radiation detectors, with solar, cosmic and all other extraneous space radiations shielded out of the detectors, being focused on the terrain, various known oil fields were surveyed. These surveys proved that a compositive curve of all terrestrial radiation when contoured on "highs," "lows," and "halos" did not provide a configuration that in any manner conformed to the known configuration of the several oil fields. Nonconformity was then recognized to be due to erosional material overlying the older formations which contained widely varying amounts of radioactive material which when added to or subtracted from the radioactivity of the strata below would give false readings each to the other when attempting to measure total radioactivity of the older strata which had been in place long enough to contain induced radioactivity and/or hydrocarbon molecules from below. Therefore, it was concluded that this curve should be used only as a reference guide to total radioactivity from which to determine what effect, if any, hydrocarbon accumulation might have upon the several types of radiation individually.

A pure gamma ray detector was then utilized to conduct identical surveys made over the same areas as mentioned above and except for the timing of the "probability of disintegration," the pure gamma ray curve average was seen to be almost identical with the total radiation curve average. This was to be expected since the greater part of all terrestrial radiations are composed of penetrating gamma and penetrating high velocity beta rays and since gamma rays, because of their nature being electromagnetic waves, would not be expected to be materially affected by hydrocarbons. When the ratio between the pure gamma ray curve and the total radiation curve is considered in relation to each other and the average ratio established, an equilibrium between them is also established and from this established state of equilibrium any unbalance may be computed to determine the relative amounts of radiation arising from the total radiation curve, plus or minus the pure gamma ray curve, thereby giving an indication of the intensity of the beta rays in the total radiation curve. The alpha rays apparently need not be considered in the total radiation curve which is fortunate because they will not penetrate the detector shell of many of the standard radiation detectors.

A radioactive gas detector was then utilized to conduct identical surveys over the same areas aforementioned, where it was found that a measurable decline in radioactive gases were present over known oil fields in all cases but that there were also some "low" anomalies shown in some cases where no oil was known to exist and in some cases where deep dry holes had been drilled thus making it clear that there was some relationship between the intensities of radioactive gases and the accumulations of hydrocarbons, the instances to the contrary notwithstanding. The instances to the contrary were deduced to be due to the differences between the emanation of radioactive gases from atomic disintegration of the radioactive materials of the top soil from which most of the gamma, beta activity arises, and the mass with depth effect of gaseous radiations from below the top soil, so that it was now necessary to consider the established equilibrium effects or the ratio between the alpha, beta, gamma and gaseous radiations curves to establish the reason for the instances where declines in gaseous radiation did not always conform to the configuration of known oil fields.

Referring now more particularly to the drawing, Figure 1 indicates schematically the method previously mentioned by which curves indicative of all radiation, gamma radiation and the intensity of radioactive gases are recorded. Preferably the radioactive gas detector 10, the gamma detector 12 and the all radiation detector 14 are employed simultaneously in surveying prospective terrain from suitable vehicles and radiations are amplified by respective amplifiers 16, 18 and 20. These measurements are preferably graphically recorded simultaneously by a triple stylus recorder.

The stylus 22 records on moving graph paper 26, a compositive curve 24 indicative of the intensity of radioactive gases obtaining over the terrain surveyed. It should be noted at this point that the moving graph paper 26 moves in the direction of the arrow in Figure 1 and is geared to a moving vehicle in relation to distance and speed. The stylus 28 graphically records a compositive curve 34 which is a measure of all radiation obtaining over the terrain surveyed and is in superposed relation to the radioactive gas curve 24 and the gamma radiation curve 30.

Figure 2:
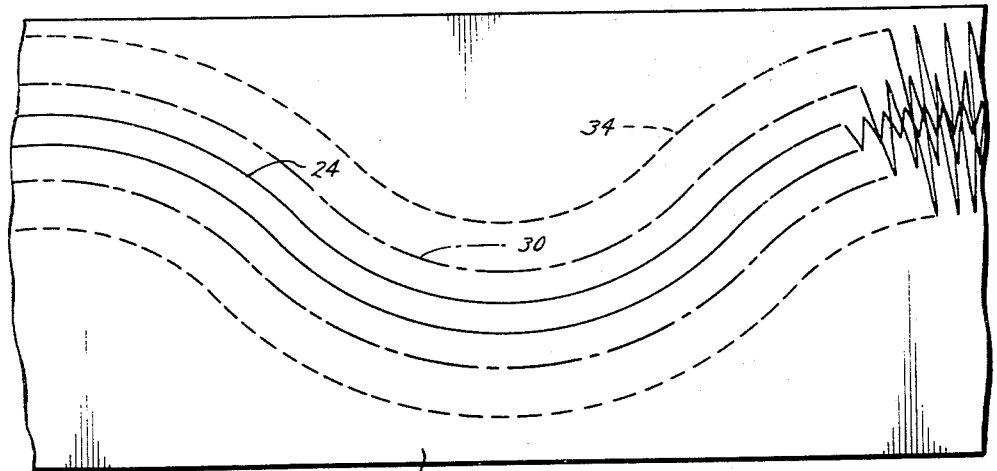
Figure 2 is a typical example of the graphic illustration obtained from a survey where the amounts of radioactivity varies but remains substantially in equilibrium.
Figure 3:
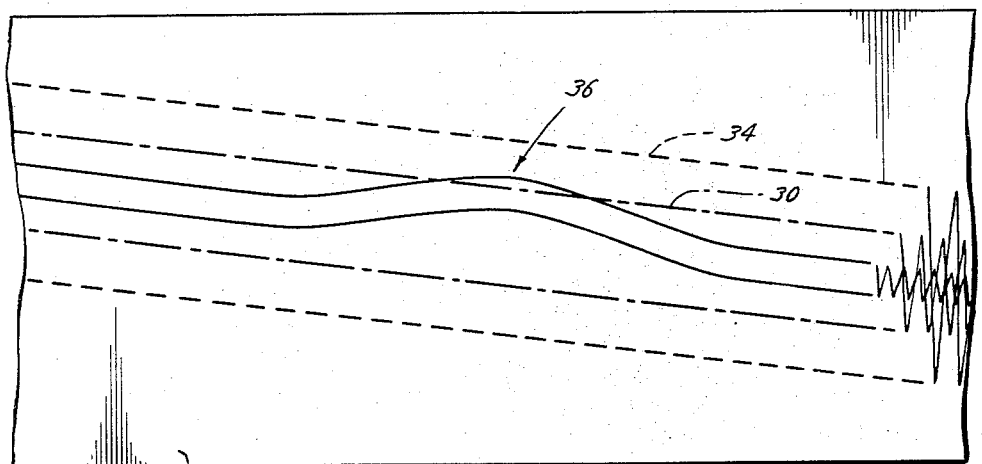
Figure 3 is a graphic illustration of survey data indicating an out of equilibrium decline in the intensity of radioactive gases indicating a formation outcrop and the presence of hydrocarbons.
Figure 4:
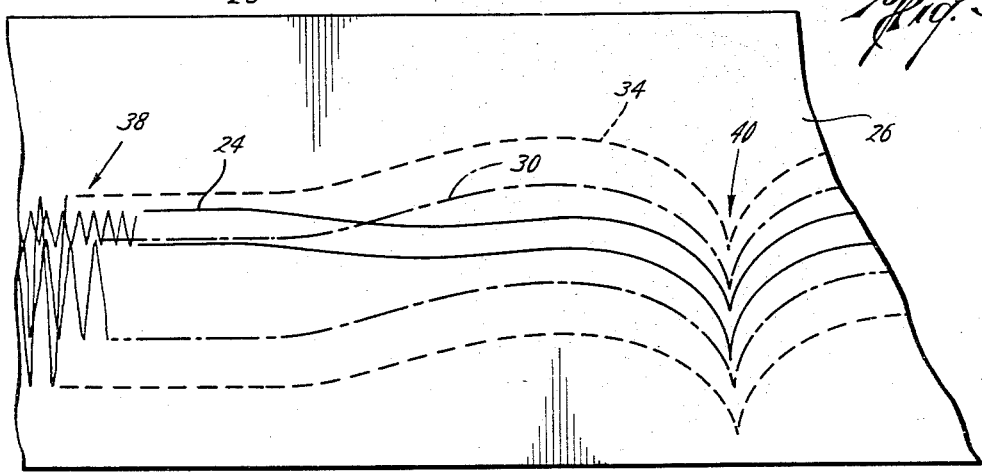
Figure 4 is another situation indicating an out of equilibrium decline of radioactive gases indicating a fault and the presence of hydrocarbons.
Figure 5:
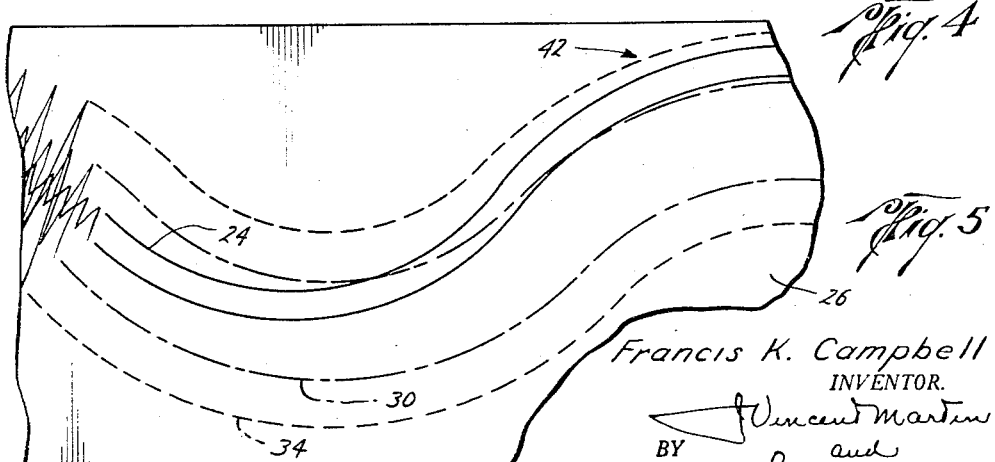
Figure 5 is another graphic example of an out of equilibrium situation such as would occur in hilly terrain and indicating an accumulation of hydrocarbons.

In view of the fact that it is by comparing a compositive curve of all radiation and gamma radiation with a curve indicative of the intensity of radioactive gases that the significant decline in the intensity of radioactive gases may be noted to indicate the presence of a hydrocarbon deposit, Figures 3, 4 and 5 are provided to be illustrative of typical situations in which hydrocarbons are indicated to be present while Figure 2 is provided to illustrate a situation in which a decline in the intensity of radioactive gases does not indicate the presence of hydrocarbons. In Figure 2 it will be noted that while there is a variation in the intensity of radioactive gases as indicated by the curve 24 that there is also a commensurate variation in the gamma radiation curve 30 and the all radiation curve 34 so that the presence of hydrocarbons is not indicated. Figure 3 shows an example of a situation indicating a decline of the gaseous radioactivity curve 24 which is out of equilibrium with the decline indicated by gamma radiation curve 30 and all radiation curve 34 which indicates a formation outcrop in the area broadly designated at 36 and the presence of hydrocarbons. Figure 4 shows another example of a decline of the radioactive gas curve 24 which is not commensurated with the all radiation curve 30 and the gamma radiation curve 34 and indicates a deposit of hydrocarbons in the area broadly designated at 38 while a fault is indicated in the area broadly designated at 40. Figure 5 demonstrates the type curve which would be obtained from a survey of hilly terrain and in which the radioactive gas curve 24 is out of equilibrium with the gamma radiation curve 30 and the all radiation curve 34 and indicates the presence of hydrocarbons in the area broadly designated at 42.

It is to be understood that while a preferred embodiment of the invention has been described in which the survey is conducted by the radioactive gas detector, the gamma radiation detector and the all radiation detector simultaneously, recordings being made graphically in superposed relation, that any number of other means may be employed to obtain graphic recordings of the results of a similar survey which would be useful in making the curves which indicate an out of equilibrium situation between the measurement of the gaseous radiation with respect to a reference guide indicative of all radiation. For example, photographic means could be utilized to facilitate such graphic illustrations.

The invention is not limited to the preferred embodiments herein disclosed. Various changes within the scope of the following claims will occur to those skilled in the art.

What is claimed is:

1. The method of locating hydrocarbons comprising, conducting surveys with an all radiation detector, amplifying and recording the radiations on a moving graph geared to a moving vehicle in relation to distance and speed, conducting similar surveys with a gamma radiation detector, amplifying and recording the radiations on a moving graph geared to a moving vehicle in relation to distance and speed, conducting similar surveys with a radioactive gas detector, and recording the radiations on a moving graph geared to a moving vehicle in relation to distance and speed, said surveys being taken at the same points, and comparing said recording to detect subsurface hydrocarbon deposits.

2. The method of locating hydrocarbons comprising, separately detecting and measuring radio active gas and gamma ray radiation at a first point, recording the intensity of such radiation, separately detecting and measuring radio active gas and gamma ray radiation at points spaced from said first point and recording the intensity of such radiation and comparing said measurements to detect subsurface hydrocarbon deposits.

3. The method of locating hydrocarbons comprising, separately detecting and measuring radiation from radio active gas and total radio activity at a first point, recording the intensity of such radiation, separately detecting and measuring radiation from radio active gas and total radiation at points spaced from said first point and recording the intensity of such radiation and comparing said measurements to detect subsurface hydrocarbon deposits.

4. The method of locating hydrocarbons comprising, separately detecting and measuring radio active gas and gamma ray radiation at a first point, recording the intensity of such radiation, separately detecting and measuring radio active gas and gamma ray radiation at points spaced from said first point and recording the intensity of such radiation, and comparing the gaseous radio activity with gamma radiation at said points to determine a decline in the gaseous radiation without a commensurate decline in gamma radiation which is an indication of the presence of a deposit of hydrocarbons.

5. The method of locating hydrocarbons comprising, separately detecting and measuring radio active gas and gamma ray and total radiation at a first point, recording the intensity of such radiation, separately detecting and measuring radio active gas and gamma ray and total radiation at points spaced from said first point and recording the intensity of such radiation, and comparing the gaseous radio activity with gamma and total radiation at said points to determine a decline in gamma and total radiation which is an indication of the presence of a deposit of hydrocarbons.

6. The method of locating hydrocarbons comprising, separately detecting and measuring radio active gas and total radiation at a first point, recording the intensity of such radiation, separately detecting and measuring radio active gas and total radiation at points spaced from said first point and recording the intensity of said radiation, and comparing the gaseous radio activity with the total radiation at said points to determine a decline in gaseous radiation without a commensurate decline in total radiation which is an indication of the presence of a deposit of hydrocarbons.

References Cited in the file of this patent

UNITED STATES PATENTS

| | | |
|---|---|---|
| 2,429,577 | French | Oct. 21, 1947 |
| 2,445,305 | Hochgesang | July 13, 1948 |
| 2,469,460 | Fearon | May 10, 1949 |
| 2,475,137 | Herzog | July 5, 1949 |
| 2,692,949 | MacKnight | Oct. 26, 1954 |
| 2,721,945 | Sell | Oct. 25, 1955 |
| 2,722,610 | Herzog | Nov. 1, 1955 |
| 2,742,574 | Weisz | Apr. 17, 1956 |
| 2,761,975 | Weisz | Sept. 4, 1956 |
| 2,781,453 | Belcher et al. | Feb. 12, 1957 |
| 2,786,144 | Weisz | Mar. 19, 1957 |